US007774126B2

(12) United States Patent
Abe et al.

(10) Patent No.: US 7,774,126 B2
(45) Date of Patent: Aug. 10, 2010

(54) ELECTROMAGNETIC FUEL INJECTION VALVE DEVICE

(75) Inventors: Motoyuki Abe, Hitachinaka (JP); Masahiko Hayatani, Munich (DE); Tohru Ishikawa, Kitaibaraki (JP); Takehiko Kowatari, Kashiwa (JP); Noriyuki Maekawa, Kashiwa (JP)

(73) Assignee: Hitachi, Ltd., Tokyo (JP)

( * ) Notice: Subject to any disclaimer, the term of this patent is extended or adjusted under 35 U.S.C. 154(b) by 268 days.

(21) Appl. No.: 12/117,295

(22) Filed: May 8, 2008

(65) Prior Publication Data

US 2008/0276907 A1 Nov. 13, 2008

(30) Foreign Application Priority Data

May 9, 2007 (JP) ............................ 2007-124059

(51) Int. Cl.

*G06F 19/00* (2006.01)
*F02M 51/00* (2006.01)
*F16K 31/02* (2006.01)
*B05B 1/30* (2006.01)

(52) U.S. Cl. .................. 701/104; 123/490; 251/129.21; 239/585.5

(58) Field of Classification Search ......... 701/101–105, 701/114, 115; 123/299, 300, 472, 478, 480, 123/490; 239/533.2, 533.3, 533.12, 585.1–585.5, 239/590, 596, 900; 251/129.15, 129.21, 251/129.22; 361/152–154
See application file for complete search history.

(56) References Cited

U.S. PATENT DOCUMENTS

| | | | | |
|---|---|---|---|---|
| 4,742,964 | A * | 5/1988 | Ito et al. | 239/585.4 |
| 5,492,277 | A * | 2/1996 | Tani et al. | 239/585.5 |
| 6,394,367 | B2 * | 5/2002 | Munezane et al. | 239/533.12 |
| 6,648,298 | B2 * | 11/2003 | Souma et al. | 251/129.21 |
| 6,769,638 | B2 * | 8/2004 | Munezane et al. | 239/596 |
| 6,918,548 | B2 * | 7/2005 | Terakado et al. | 239/585.5 |
| 7,021,569 | B1 * | 4/2006 | Ogura et al. | 239/585.4 |
| 7,095,599 | B2 * | 8/2006 | Maekawa et al. | 361/152 |
| 7,334,563 | B2 * | 2/2008 | Mifuji et al. | 123/299 |

FOREIGN PATENT DOCUMENTS

| | | | |
|---|---|---|---|
| JP | 2002-115591 | A | 4/2002 |
| JP | 2005-113757 | A | 4/2005 |
| JP | 2006022655 | A * | 1/2006 |
| JP | 2007-218204 | A | 8/2007 |
| JP | 2007-218205 | A | 8/2007 |

* cited by examiner

*Primary Examiner*—Willis R Wolfe, Jr.
(74) *Attorney, Agent, or Firm*—Crowell & Moring LLP

(57) ABSTRACT

An electromagnetic fuel injection valve device for an internal combustion engine is configured to carry out an energization to an electromagnetic coil of an injection valve actuator for a valve opening motion and additionally carry out a mid-term energization at a time interval between both an energization for valve opening of a previous fuel injection and an energization for valve opening of a subsequent fuel injection. A current of the mid-term energization is smaller than a current of the energization for valve opening motion and has the same direction as a direction of the current of the energization for valve opening motion.

9 Claims, 8 Drawing Sheets

ELECTROMAGNETIC FUEL INJECTION VALVE DEVICE

CLAIM OF PRIORITY

The present application claims priority from Japanese application serial no. 2007-124059, filed on May 9, 2008, the content of which is hereby incorporated by reference into this application.

FIELD OF THE INVENTION

The present invention relates to a controller for driving an electromagnetic fuel injection valve used in an automobile internal combustion engine.

BACKGROUND OF THE INVENTION

In a normally closed type electromagnetic fuel injection valve, an electromagnetic actuator as a means for driving a valve element is comprised of a magnetic coil, a stationary core (also referred to as a stationary core or simply as a core) and a movable core (also referred to as an anchor or plunger). When the coil is not energized, the valve element is pressed on a valve seat by a return spring and the valve is kept closed. In this valve closed state, the fuel injection valve has a gap between the movable core and the stationary core. When a driving current is passed through the coil, magnetic flux is generated in a magnetic circuit comprised of the stationary core and the movable core, and the magnetic flux also passes through a gap between the movable core and the stationary core. As a result, a magnetic attractive force is exerted on the movable core. When this magnetic attractive force overcomes a force exerted from the return spring, the movable core moves toward the stationary core.

In a conventional fuel injection valve, it is known that the fuel injection valve has a driving coil energized in the early stage of valve opening operation and a hold coil energized when the valve is held in an open state. Furthermore, it is known in a fuel injection valve device that, by lengthening the time period for which the driving coil is energized, a valve closing speed is reduced due to magnetomotive force that occurs just after the energization of the driving coil is terminated. In the fuel injection valve device, a current passed through the driving coil is large and attractive force in the valve opening direction is also large. Consequently, falling of the attractive force just after the termination of the driving coil energization becomes gentle, and it is possible to reduce the valve closing speed and to reduce an impact from the collision of the valve element with the valve seat when the valve is closed (Claims and specification's 31st paragraph of JP-A-2002-115591).

The above-mentioned conventional art discloses a method for reducing the impact by reducing the valve closing speed before the valve element collides with the valve seat. However it does not consider about the behavior of the valve element or the movable core after the valve element is seated on the valve seat. Even after the valve element collides with the valve seat, the valve element or the movable core does not immediately stop its motion and they continue vibratory motion.

Especially, when a fuel injection valve device is so configured that a movable core or a valve element is separated from each other and the movable core can be moved relative to the valve element, the following takes place: even after the valve element comes into contact with the valve seat in a valve closing operation, the movable core continues an inertial motion relative to the valve element and keeps moving toward the valve seat. This lengthens the time for which the motion of the movable core is terminated. For this reason, it may take some time for the relative positional relation between the movable core and the valve element to return to an initial state in which the valve can be opened.

This problem, though its severity is lower, also arises in constructions in which the movable core and the valve element are joined to each other. More specific description will be given. After the valve element collides with the valve seat, there is a spring-mass system in which the valve element is a spring element and the movable core is a mass element. Therefore, the movable core can continue to move toward the valve seat and is ready to continue vibratory motion. For this reason, it may take some time for the movable core to get into a state in which it can stably carry out the next injection.

As mentioned above, for a fuel injection valve to stably carry out the next injection after it completes one time of injection, it used to be required to wait for a certain time.

An object of the invention is to provide an electromagnetic fuel injection valve device wherein the time from the termination of injection to the start of the next injection can be shortened.

SUMMARY OF THE INVENTION

In the invention, to achieve the above object, an electromagnetic coil for an injection valve actuator is energized so that the following is implemented after a valve element is brought into contact with a valve seat: a force in the direction opposite to the direction of the action of the valve element and a movable core moving from the valve open state to the valve closed state is exerted on the movable core.

Namely, the above-mentioned energization to the coil are carried out at a mid-term (time interval) between both an energization for valve opening of a previous fuel injection and an energization for valve opening of a subsequent fuel injection.

A fuel injection valve is so configured that the following is implemented: in the valve closed state in which the valve element and the valve seat are in contact with each other, the electromagnetic coil is energized to exert an attractive force on the movable core; and the valve element is thereby driven in the valve opening direction and is caused to transition to the valve open state. In this fuel injection valve, the following measure is taken in valve closing operation from the valve open state to the valve closed state: after the valve element collides with the valve seat, the coil is energized to exert the force (i.e., attractive force) on the movable core in the direction opposite to the direction of valve closing operation.

This makes it possible to suppress the motion of the movable core after the valve element is brought into contact with the valve seat, and to quickly return the movable core to the initial position where it was at the start of valve opening operation.

According to the invention, the movable core can be quickly returned to the initial position where it was at the start of valve opening operation. Therefore, it is possible to provide a fuel injection valve wherein the time from the completion of injection to the start of the next injection is shortened.

DETAILED DESCRIPTION OF THE PREFERRED EMBODIMENTS

Hereinafter, description will be given to embodiments of the invention.

First Embodiment

Figure 1:
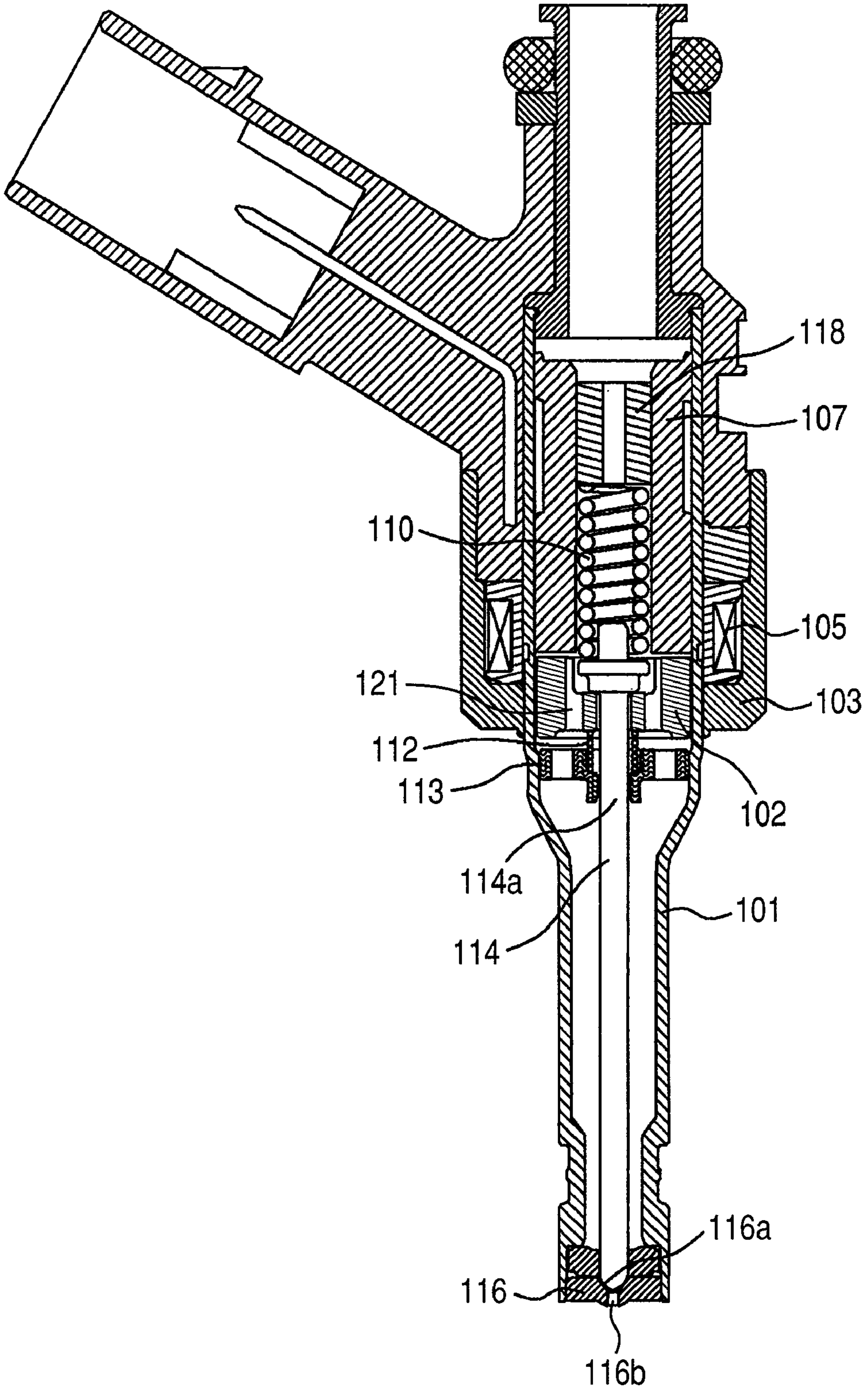
FIG. 1 is a sectional view illustrating an embodiment of a fuel injection valve of the invention.
Figure 2:
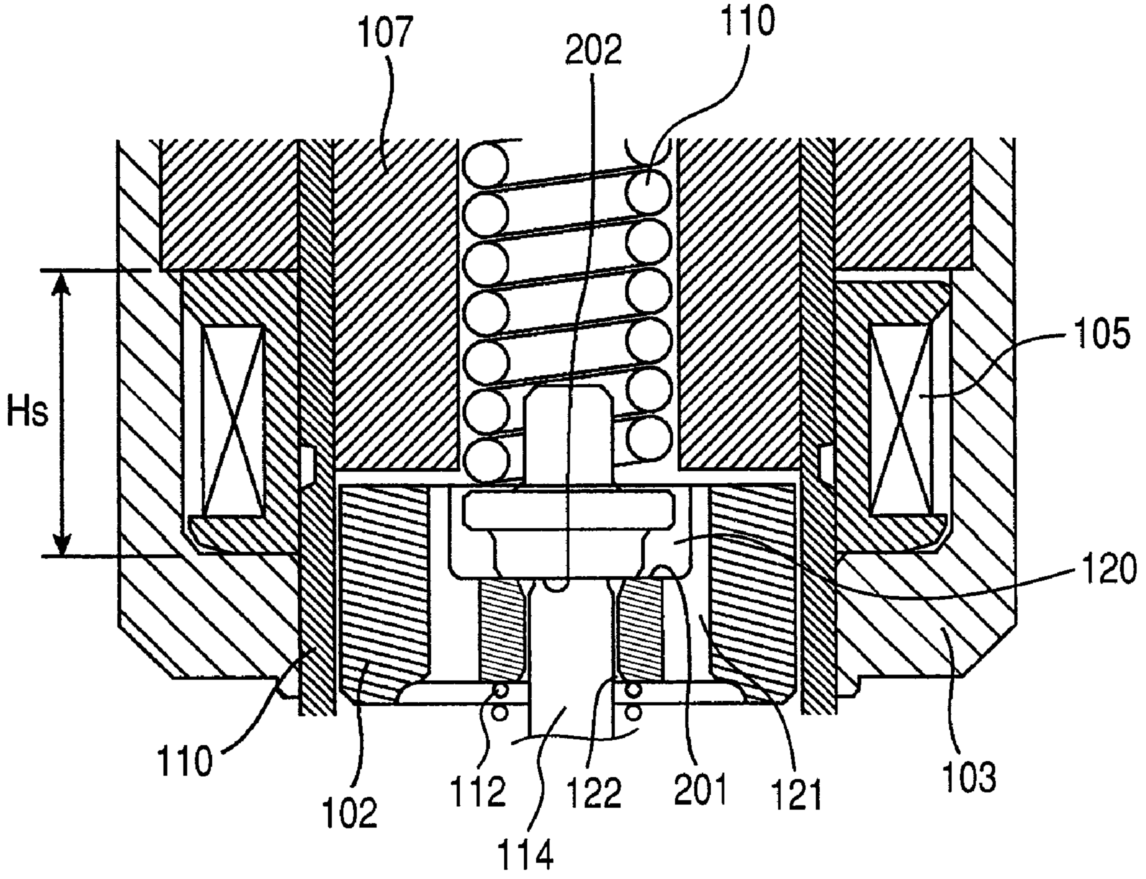
FIG. 2 is an enlarged sectional view illustrating an area in proximity to the collision portions of the movable core and the valve element of a fuel injection valve in a first embodiment of the invention.

FIG. 1 is a sectional view of a fuel injection valve of the present invention, and FIG. 2 is an enlarge view of an area in proximity to a movable core.

The fuel injection valve illustrated in FIG. 1 is a normally closed type electromagnetic valve (electromagnetic fuel injection valve).

In the fuel injection valve of the embodiment, a movable core 102, a stationary core 107, a return spring 110, a movable core-initial positioning spring 112, a valve rod guide 113, a needle type valve element 114, a nozzle member 116 with a valve seat 16*a* and a nozzle orifice 116*b*, and a cylindrical-shape spring retainer 118 etc. are incorporated inside of a cylindrical valve housing 101. The spring retainer 118 is fixed inside of the stationary core 107, and the return spring 10 is interposed between the spring retainer 118 and a valve rod 114*a* in the stationary core 107. The valve rod guide 113 having fuel-through holes is fixed an inner wall of the valve housing 101. The valve rod guide 113 also acts as a retainer for the movable core-initial positioning spring 112. The movable core 102 having fuel-through holes 121 is positioned separately from the valve element 114 between the stationary core 107 and the valve rod guide 113. The valve rod 114*a* is thread trough a center hole 122 of the movable core 102 and the valve rod guide 113. A flange portion of the valve rod 114*a*, which is provided close to a top of the valve rod 114*a*, is positioned in a hollow portion 120 formed at upper side of the movable core 102. A spring force of the return spring 110 is exerted on the valve rod 114*a* (valve element 114) via the flange portion of the valve rod. An electromagnetic coil 105 and a yoke 103 are provided around the valve housing 101. The nozzle member 116 is fixed at the tip of the valve housing 101.

When the coil 105 is not energized, the valve element (needle) 114 is pressed on a valve seat 116*a* by the return spring 110 and the valve is kept closed (referred to as valve closed state). The valve seat 116*a* is formed on the nozzle member 116. In the valve closed state, the movable core 102 is kept in close contact with the valve element (flange portion thereof) 114 by the spring force of the movable core-initial positioning spring 112. In this state, there is a gap between the movable core 102 and the stationary core 107. The rod guide 113 for guiding the valve rod 114*a* of the valve element 114, which is fixed on the valve housing 101, act as the spring seat for the movable core-initial positioning spring 112. A spring force from the return spring 110 is adjusted by the push-in amount of the spring retainer 118 fixed in the bore in the stationary core 107 when the valve is assembled.

The coil 105, stationary core 107, and movable core 102 configure an electromagnetic actuator for the valve element 114. The return spring 110 that makes a first preload means exerts the spring force on the valve element 114 in the direction opposite to the direction of driving force from the actuator. The movable core-initial positioning spring 112 that makes a second preload means exerts the spring force smaller than that of the return spring 110 on the movable core 102 in the direction of the driving force (direction of magnetic attractive force from the stationary core 107).

When a current is passed through the coil 105, magnetic flux is generated in a magnetic circuit constructed of the stationary core 107, movable core 102, and a yoke 103. The magnetic flux also passes through the gap between the movable core 102 and the stationary core 107. As a result, the magnetic attractive force is exerted on the movable core 102. When the generated magnetic attractive force overcomes the spring force of the return spring 110, the movable core 102 is moved (displaced) toward the stationary core 107. When the movable core 102 is moved, the moving force is transferred from the contact face 201 of the movable core 102 and the contact face 202 of the valve element (flange portion of the needle) 114. Thereby, the valve element 114 is simultaneously moved together with the movable core 102 and the valve element 114 starts a valve opening operation and becomes the valve open state. The lift amount of the valve in the valve open state is adjusted by the distance from the contact face 202 of the valve element 114 to the seating portion of the valve element 114 that collides with the valve seat 116*a*.

When the current passing through the coil 105 in the valve open state is stopped, the magnetic flux passing through the magnetic circuit is reduced, and thereby the magnetic attractive force exerted between the movable core 102 and the stationary core 107 is reduced. The spring force of the return spring 110 exerted on the valve element 114 is transferred to the movable core 102 through the contact face 202 of the valve element 114 and the contact face 201 of the movable core 102. Therefore, when the spring force of the return spring 110 overcomes the magnetic attractive force, the movable core 102 and the valve element 114 are moved in the valve closing direction and the valve becomes the valve closed state.

Figure 3:
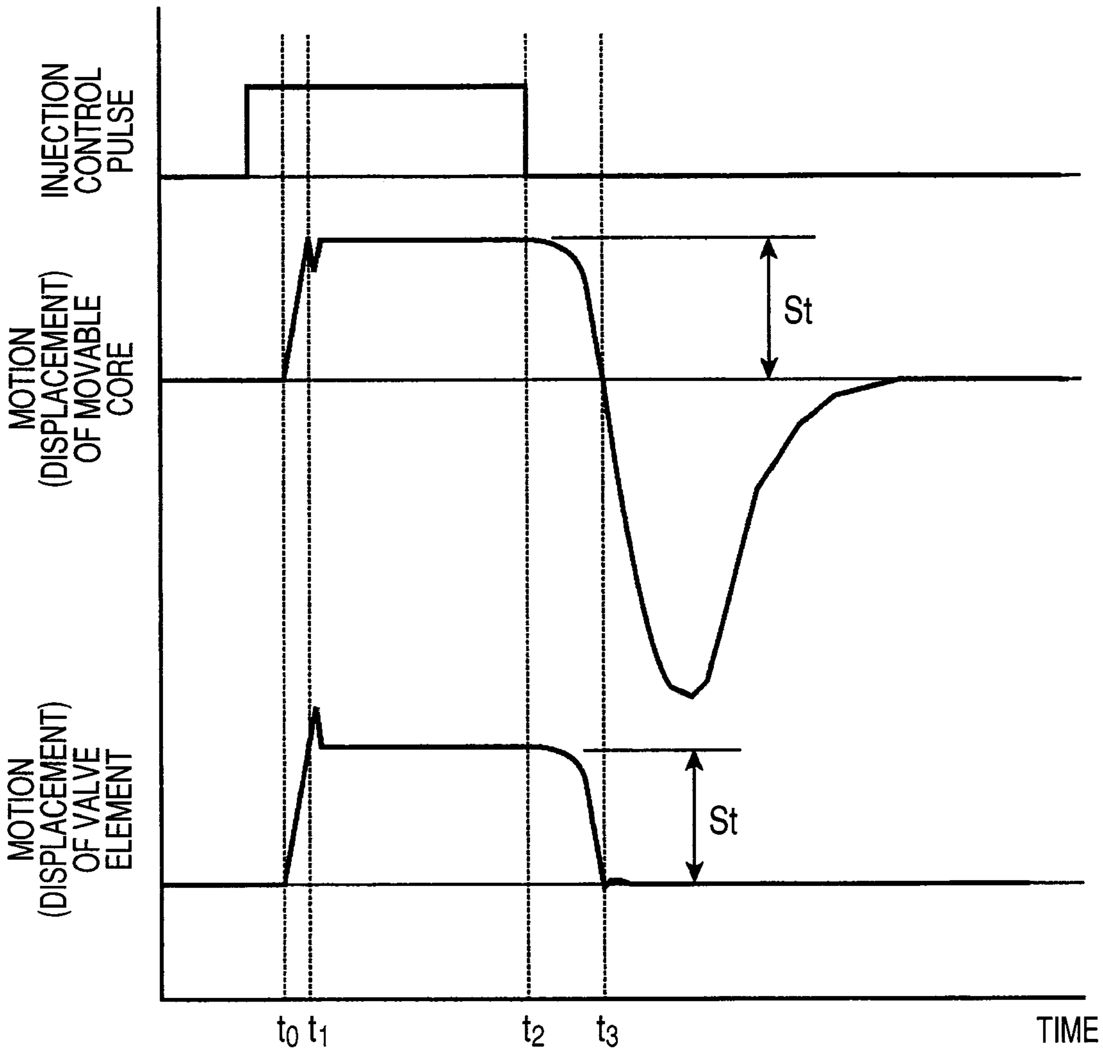
FIG. 3 is a time chart illustrating the state of motion of the movable core and the valve element of a fuel injection valve according to related art.

When the seating portion of the valve element 114 is brought into contact with the valve seat 116*a*, the motion of the valve element 114 in the valve closing direction is stopped. Even after then, the movable core 102 that can move relative to the valve element 114 continues its motion so far due to an inertial force, thereby the impact of a shock occurred at the time of the valve seating motion can be lessened. FIG. 3 is a time diagram illustrating this state by the amounts of displacement of the movable core 102 and the Valve element 114.

As illustrated in FIG. 3, the valve closing operation is started after time t2 when energization for the coil 105 is stopped. Even after time t3 when this energization is stopped, the movable core 102 continues its motion. While the movable core 102 is continuing its motion, the distance between the movable core 102 and the stationary core 107 is large and the contact faces 201, 202 of the movable core 102 and the valve element 114 are away from each other. In this state, even when energization for the coil 105 is restarted, therefore, the valve cannot be opened again as long as the movable core 102 continues its motion.

For this reason, a predetermined wait time is required before the next injection is restarted after the present injection is completed. When the fuel injection is carried out more than once at close time intervals in one stroke of an internal combustion engine, there are used to be a limit in reducing the time intervals. The intervals between multiple times of fuel injection could be reduced by rapidly passing a large current. However, a high voltage is required to passes a large current through a fuel injection valve used in in-cylinder direct injection engines. This high voltage is obtained by accumulating electric charges in a capacitor during a non-injection period (period for which injection is stopped). For this reason, when the time interval between both of some point in time and a subsequent point in time is shortened, there is only a time too short to accumulate electric charges after discharge and it is difficult to obtain sufficient effect.

Figure 4:
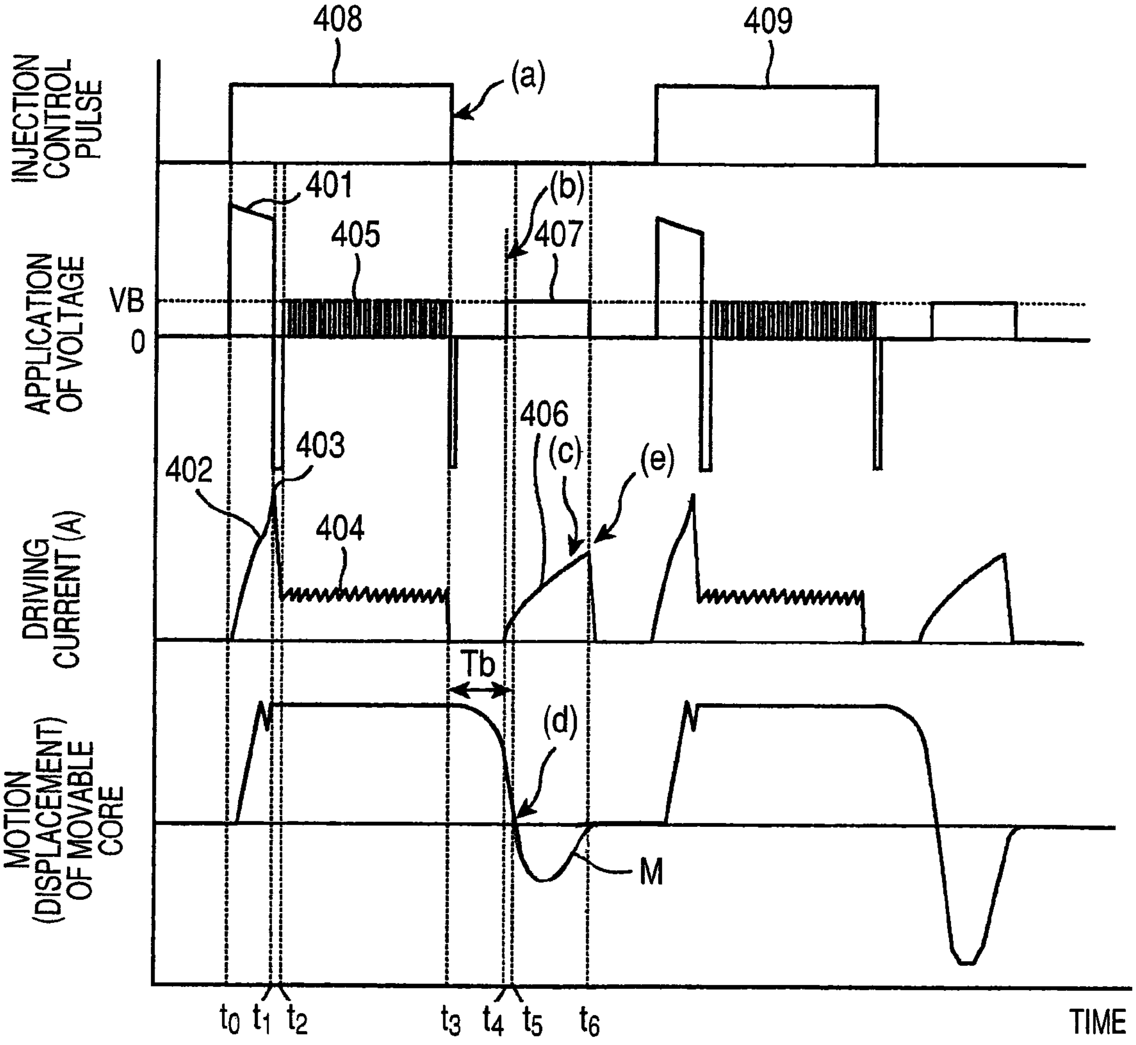
FIG. 4 is a time chart illustrating the driving current for a fuel injection valve and the motion of a movable core in the first embodiment of the invention.

To cope with this, energization is carried out just after time t5 when the valve closing operation is completed as illustrated in FIG. 4.

In the first injection, a high voltage is applied to the coil 105 of the fuel injection valve in conjunction with input of a pulse (time t0) and energization is started. At this time, the passage of a driving current 402 is started and the current value is increased. The power for the high voltage 401 is obtained by boosting the battery voltage and thereby accumulating the electric charges in the capacitor. When the driving current is passed through the coil 105, therefore, the voltage drops gradually. The application of high voltage is stopped when the current is increased to the level at which the movable core 102 is sufficiently moved (displaced at time t1). If the flyback current of the coil is interrupted using a diode or the like to cause the current value to quickly fall to a small value, a negative voltage may be produced between the terminals of the coil.

When the application of the high voltage 401 is terminated, energization 405 by battery voltage is started to hold the movable core 102 attracted (time t2). A common practice taken at this time is to regulate the applied voltage by switching to make the current value constant. When the holding current (in the first injection) is stopped, the movable core starts valve closing operation (time t3).

The time (valve closing delay time Tb) from when the holding current in the first injection is stopped (a) to when the valve closing operation is completed (d) is determined by the characteristics of the fuel injection valve. It is not varied so much depending on conditions, such as fuel pressure. When approximately ¾ or more of the valve closing delay time Tb has passed, the valve element 114 and the movable core 102 move away from the stationary core 107. As a result, the magnetic attractive force generated due to the holding current 404 is reduced and sufficient speed of valve closing motion is obtained.

Therefore, it is advisable to take the following procedure after energization (application of voltage for holding current) is stopped: the energization is continuously stopped over a time longer than ¾ of the time from when the holding current 404 is stopped to the valve closing delay time Tb; and then a voltage 407 is applied prior to starting energization for attracting the movable core 102. The application of the voltage 407 and the resulting passage of current through the coil 105 are designated as a mid-term energization at an interval between injection control pulses. Especially, when the mid-term energization 407 is carried out after the valve element 114 is brought into contact with the valve seat **116*a* and the valve is closed to close the fuel passage, the following advantage is brought: the valve closing speed of the movable core 102 or the valve element 114** is not reduced by the mid-term energization.

When the mid-term energization (the voltage 407 and a driving current 406) is carried out between times t4 and t6 a magnetic field is produced between the stationary core 107 and the movable core 102 to generate magnetic attractive force. The movable core 102 is caused to early stop the motion of moving away from the stationary core 107 by this magnetic attractive force and is attracted to the stationary core 107. As a result, as shown by a solid line M of FIG. 4, the movable core 102 can be quickly returned to the initial position where the valve opening operation is started (namely the initial position is a position where the contact face 201 of the movable core is in close contact with the contact face 202 of the valve element 114 by the spring force of the movable core-initial positioning spring 112 when the coil 105 is not energized).

It is advisable to use the battery voltage as the mid-term voltage applied to attract the movable core 102 at this time. Use of the battery voltage enables the following: energization for attracting the movable core 102 to the stationary core 107 can be carried out without discharging electric charges from the capacitor for the application of boosted high voltage. Further, it is advisable to produce the current 406 of this mid-term by the battery voltage so that the current value reaches a value equal to or higher than the value of holding current 404, without carrying out control of the applied voltage by switching.

Figure 5:
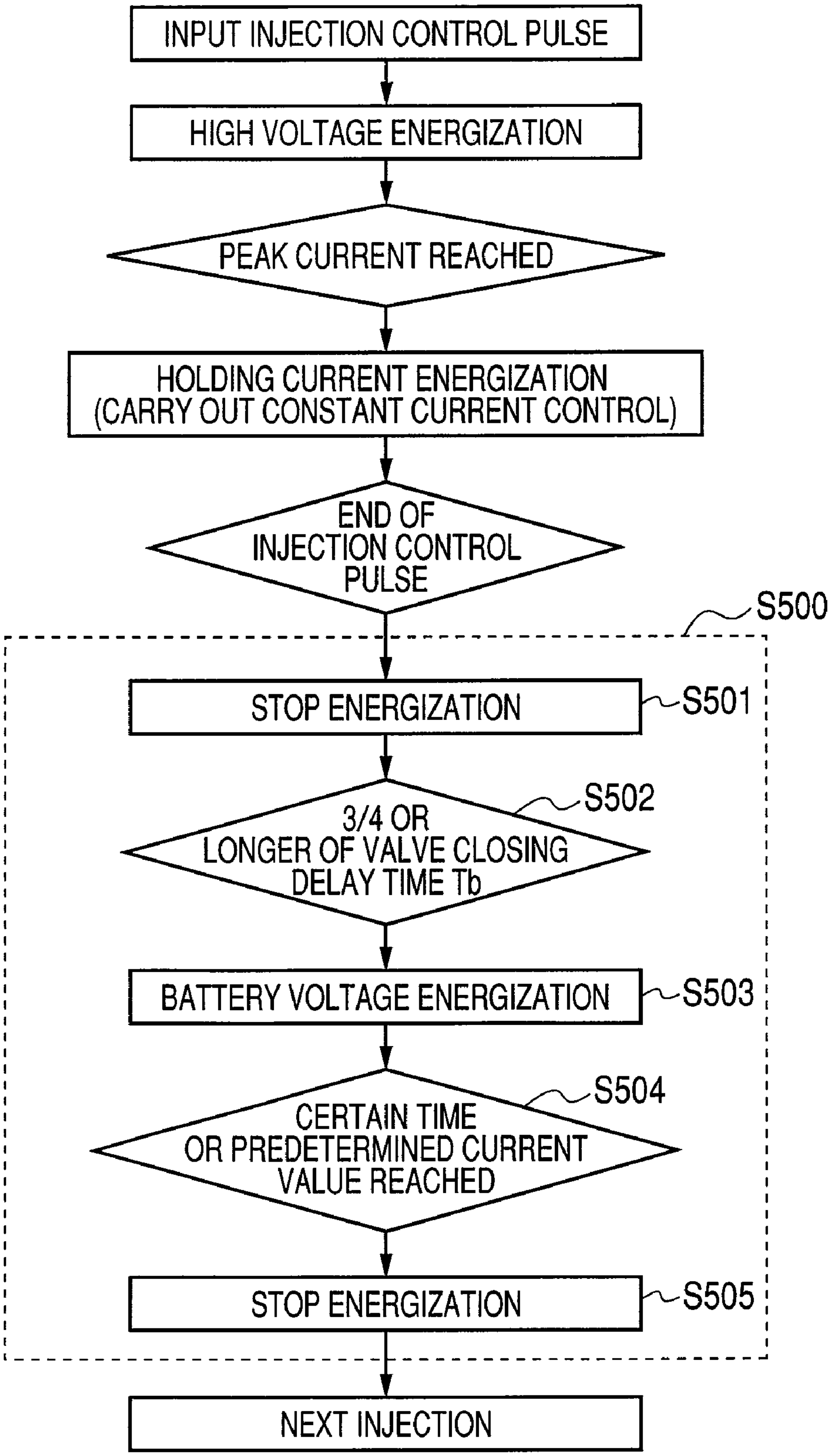
FIG. 5 is a flowchart illustrating a driving procedure for a fuel injection valve in the first embodiment of the invention.

As mentioned above, by carrying out the mid-term energization just after stopping an injection control pulse, the movable core 102 can be quickly returned to the initial position, and thereby shorten the time interval before the next injection. FIG. 5 illustrates the flow chart of this energization control. The steps encircled with a broken line 500 are in the processing flow of the invention. More specific description will be given. Energization for the valve opening and its holding motion is stopped in correspondence with the end of an injection control pulse (S501). Thereafter, stop of energization is kept for a predetermined time (at least equal to or longer than ¾ of the valve closing delay time Tb) (S502), and then mid-term battery voltage (battery voltage energization) is applied (S503). After that, when a predetermined time has passed off or the value of the current 406 due to the mid-term voltage 407 is reached (S504) to a predetermined threshold value, the mid-term energization is terminated (S505). As mentioned above, the predetermined threshold current value is set to a value equal to or higher than the value of the holding current 404 of the fuel injection valve. After that, next energization for valve opening and its holding motion (next injection) is carried our again by the input injection control pulse.

Figure 8:
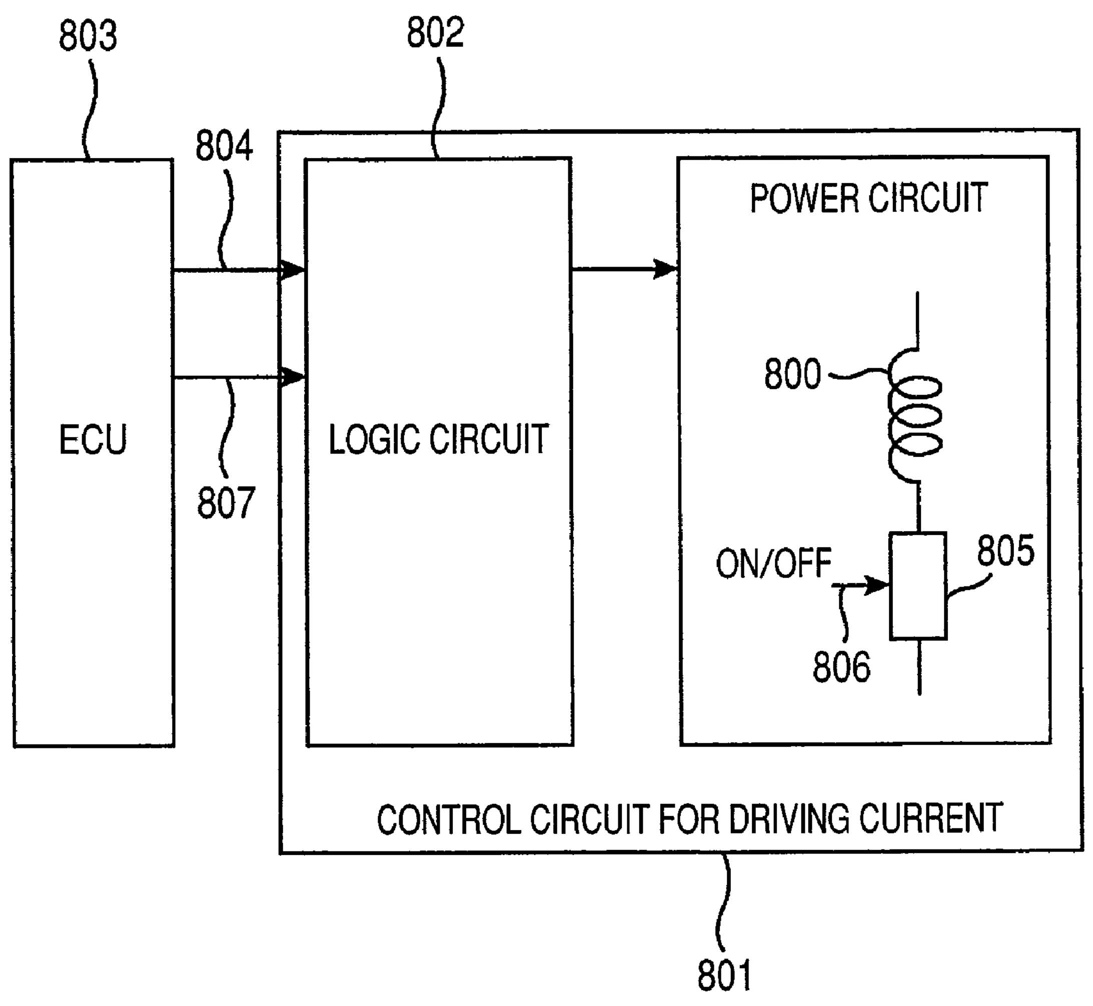
FIG. 8 is an explanatory drawing of an energization control circuit for a fuel injection valve.

It is advisable to use a logic circuit 802 of a control circuit 801 for the driving current to carry out this energization control as illustrated in FIG. 8. The energization control could be carried out using a computer such as an ECU 803. However, if carrying out the energization control by only the ECU 803, this is prone to impose a heavy load on the ECU 803. Because, in current control for a fuel injection valve 800, in general, a time resolution lower than 1 ms is required. For this reason, in this embodiment, the energization control for driving current is carried out by the logic circuit 802. Thereby, it can be sufficiently controlled without imposing a load on the ECU 803. For example, it is effective to use the following drive circuit: a drive circuit that forms an injection pulse 806 internally by itself to turn on/off FET 805 for carrying out current control to generate the current 406 in response to an inputted injection control pulse 804.

Driving a fuel injection valve as mentioned above brings the following advantage: when injection is carried out more than once in one stroke of an in-cylinder direct injection internal combustion engine, the intervals between times of injection can be shortened and this is useful. When fuel injecting operation in one stroke of an internal combustion engine is divided into multiple times to inject fuel, the following advantage is brought: the shape of fuel spray can be controlled by how to divide fuel injecting operation, and thus the formation of an air fuel mixture can be controlled. For example, when the ignition timing is delayed at start of an internal combustion engine to increase exhaust gas temperature or reduce emission, the stability of combustion is prone to depend on how an air fuel mixture is formed. When fuel injecting operation is divided into multiple times, the state of formation of the air fuel mixture is varied according to how it is divided and combustion stability may be enhanced. When the intervals of divided injections can be shortened in such a case, the range within which the formation of an air fuel mixture can be controlled is widened and ignition timing can be more easily delayed. Such advantages are similarly produced in enhancing the stability of idling.

The advantages of injecting fuel more than once in one stroke are brought about not only in idling and emission reduction at start. It is effective also in output enhancement for an internal combustion engine, for example. To enhance the output of the internal combustion engine, in general, an intake air quantity must be increased. One of methods for increasing an intake air quantity is utilization of the cooling effect with fuel. When injection is divided and carried out twice or more in one stroke, fuel can be injected so that the fuel spray being injected is divided into plural times. Therefore, the area of contact between air and fuel is increased, and this accelerates atomization of fuel and facilitates cooling of intake air. As a result, an intake air quantity is increased and it becomes easier to enhance the output of the internal combustion engine. When the energization control for driving the fuel injection valve of the invention is used at this time, the injection interval when the number of fuel injection is divided into plural can be shortened, and the total fuel injection quantity is not significantly reduced. Consequently, higher-powered internal combustion engines can be coped with.

In the description of this embodiment, a case where the movable core 102 and the valve element 114 can be moved (namely displaced) relative to each other is taken as an example. The same effect can also be obtained when the movable core 102 and the valve element 114 are fixed together. When the movable core 102 and the valve element 114 are fixed together, the following takes place even after the valve element 114 is brought into contact or collides with the valve seat: a spring-mass system in which the valve element 114 is a spring element and the movable core 102 is a mass element is formed. The movable core 102 continues, though slightly, its motion in valve closing operation. For this reason, multiple times of injection cannot be carried out at close time intervals in some cases. To cope with this, it is advisable to take such a measure as in this embodiment. That is, the coil 105 is energized by mid-term energization when a predetermined time has passed after the energization for the valve opening motion and holding is stopped or after the injection control pulse 804 is turned off. Magnetic attractive force is thereby exerted between the movable core 102 and the stationary core 107. For this reason, the motion of the movable core 102 is conducted against the magnetic attractive force and the energy of the movable core 102 is quickly dissipated. Therefore, the motion of the movable core 102 early ceases and the time before the next injection becomes feasible can be shortened.

Second Embodiment

Figure 6:
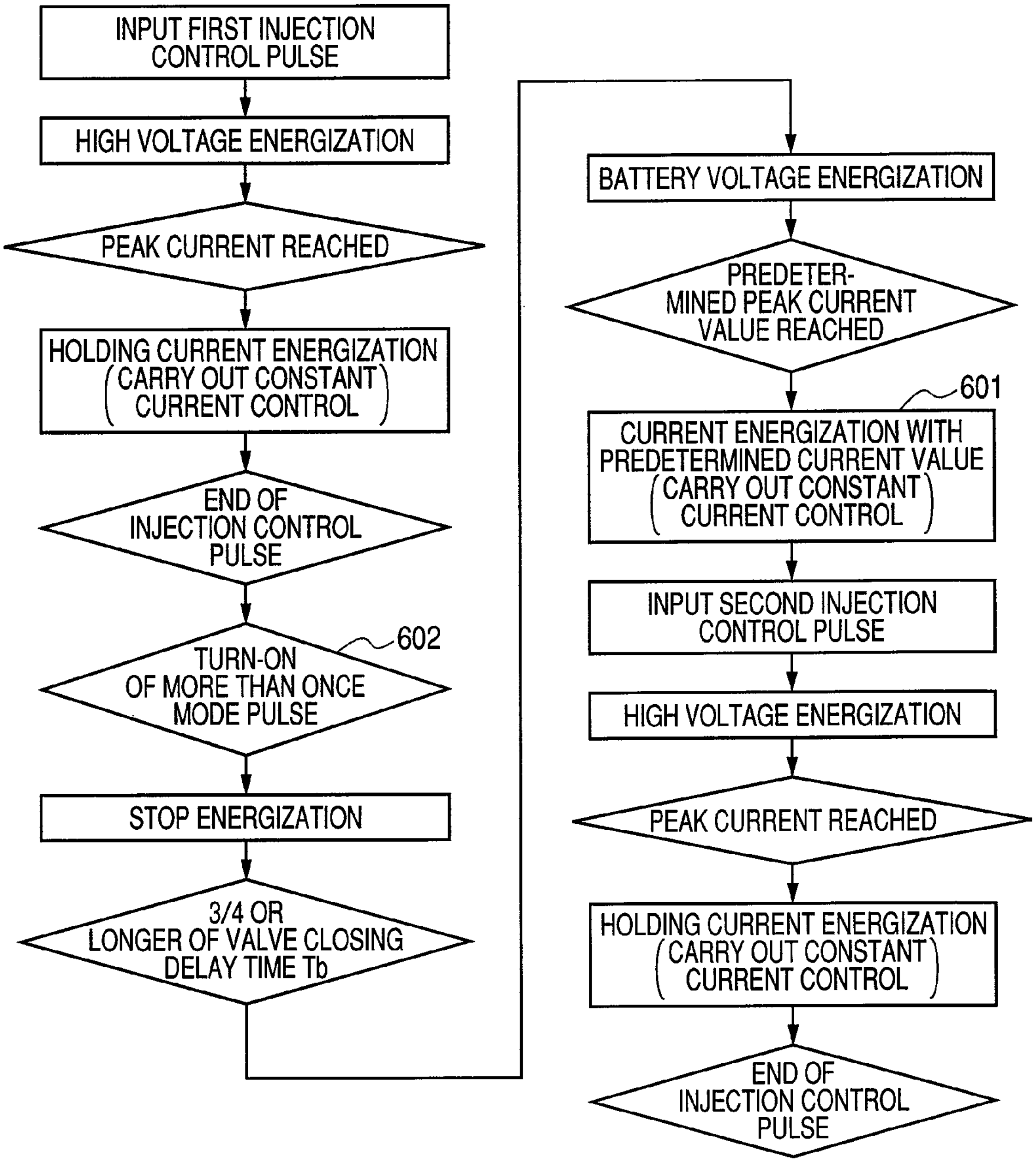
FIG. 6 is a flowchart illustrating a driving procedure for a fuel injection valve in a second embodiment of the invention.
Figure 7:
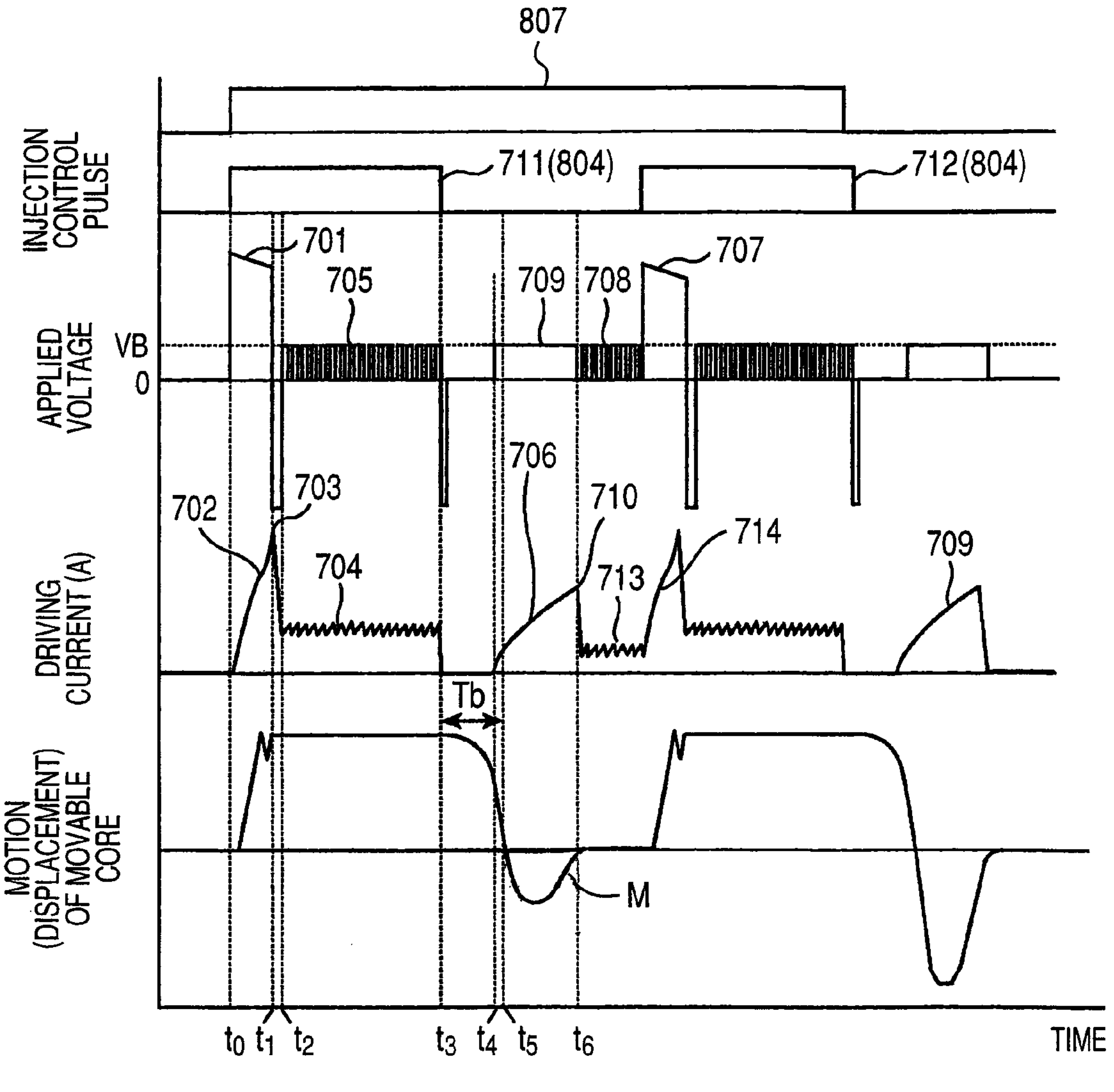
FIG. 7 is a time chart illustrating the driving current for a fuel injection valve and the motion of a movable core in the second embodiment of the invention.

FIG. 6 is a flowchart illustrating current control (energization control) in a second embodiment of the invention. In this embodiment, the mid-term energization after the valve is closed (namely after the injection control pulse is turned off) is not stopped in a certain time period t5-t6 (refer to FIG. 7), as indicated in Block 601. Namely, as shown in FIG. 7, after a driving current 706 of the mid-term energization reached to a predetermined threshold value 710, the applied current is subsequently continued with an approximately predetermined constant current value (refer to a reference numeral 713). Since it is required to discriminate a normal type fuel injection and a divided type fuel injection from each other, the following measure is taken: in addition to the normal injection control pulse 804, plural time-fuel injection discrimination mode (in one stroke of an internal combustion engine) pulse 807 is inputted from the ECU 803 in FIG. 8 to the driving current control circuit 801 for the fuel injection valve 800.

FIG. 7 is a time chart illustrating of the second embodiment In addition to the normal injection control pulse 804, the pulse 807 indicating the plural-time injection discrimination mode is inputted as an electrical signal to the driving current control circuit 801. The logic of the injection control pulse 804 and the plural-time injection discrimination mode pulse 807 may be positive or negative. The normal injection control pulse 804 is inputted from the ECU 803 to the driving current control circuit 801 at close intervals like the injection control pulses 711 and 712 illustrated in FIG. 7. The plural-time injection discrimination mode pulse 807 is inputted so that it is turned on before the first injection control pulse 711 is stopped and is turned off after the injection control pulse 712 is started. This is because the mid-term energization carried out to pull back the movable core 102 after the valve is closed must be carried out during a time period from when the first injection control pulse 711 is terminated to when the next injection control pulse 712 is started. Namely, the plural-time injection discrimination mode pulse 807 is used to carry out plural time-injection pulses (for example, divided pulses 711 and 712) and the mid-term energization (in the case of FIG. 7, applied voltages 709 and 708, and driving currents 713).

When the injection control pulse 711 is inputted, high applied voltage 701 is applied as in normal injection and a driving current 702 is passed through the coil 105. When the driving current 702 is reached to a predetermined threshold value 703, the application of the high applied voltage 701 is terminated, and a holding current 704 generated by applying and switching the battery voltage (705) is passed through the coil 105. When the injection control pulse 711 is terminated, the driving current (holding current) 704 is stopped and the movable core 102 starts valve closing operation. Only when the valve closing delay time Tb has passed off after the injection control pulse 711 is terminated, the valve element 114 is brought into the valve closed state. When the movable core 102 and the valve element 114 can move relative to each other, the movable core continues its motion with the inertial force.

After the injection control pulse 711 is turned off, the driving current is stopped by a time equal to or longer than ¾ of the valve closing delay time Tb and then mid-term voltage 709 is applied to pass the mid-term current 706 through the coil 105. The application of the voltage 709 and the passage of the current 706 are also designated as mid-term energization. The plural time-fuel injection discrimination mode pulse 807 must have been in on-state at this time. By this passage of current, the movable core 102 can be is attracted to the stationary core side 107 and quickly returned to the initial position where the valve opening operation is started as well as the first embodiment.

In this embodiment, furthermore as described above, even after the mid-term current 706 reached to the threshold value 710, the current is not terminated but the applied voltage 708 is switched to keep the passage of a constant mid-term current 713 with a predetermined current value. It is desirable that the current value of the current 713 at this time should be lower than the current value of the holding current 703. This is for preventing the valve from being opened again with unexpected timing as the result of the passage of excessive current.

When the next injection control pulse 712 is inputted, high voltage 707 is applied to the coil again and the next fuel injection is carried out. The value of the high voltage 707 applied at this time is lower than the value of the previous high voltage 701 applied. The reason for this is as follows: electric charges discharged from the capacitor by the first application of high voltage cannot be sufficiently charged in a short time between times of injection, and the voltage of the high-voltage power supply becomes lower than the previous high-voltage.

The mid-term current 713 passed through the coil 105 before the next fuel injection has the advantage of improving the start-up time of a driving current 714 applied at the next fuel injection even when the high-voltage 707 becomes lower than the previous high-voltage as described above. That is, the motion of the movable core 102 is early stopped by the current 706 so that the movable core 102 can inject fuel again. Further, the magnetic flux produced between the stationary core 107 and the movable core 102 at this time is maintained. This makes it possible to lighten the load of the required magnetic flux to which it must be increased for the next injection. Even when the voltage 707 is insufficient, therefore, the current 714 can be quickly raised. There is a relation between a time change in magnetic flux and a current for the magnetic flux, and the proportionality coefficient becomes inductance. When there has been already magnetic flux between the stationary core 107 and the movable core 102, the rate of time change in magnetic flux is reduced. This lowers the apparent inductance and makes it possible to quickly energize for the current.

As illustrated in FIG. 7, this embodiment is so set that the following is implemented: after the completion of injection, the mid-term current 709 is passed through the coil to early return the movable core 102 to the initial position in preparation for the third fuel injection and subsequent times of fuel injection. When the number of times of the fuel injection to be carried out at close time intervals is two, the current 709 may be unnecessary. When three or more times of injection are to be carried out, the following measure can be taken: the plural time-fuel injection discrimination mode pulse 807 is extended to or beyond the third or following injection pulse so that a current equivalent to the mid-term current 706 and current 713 can be passed.

According to the above-mentioned energization control in this embodiment, the fuel injection can be carried out more than once at short time intervals and the next injection can be more quickly carried out.

In the two embodiments described up to this point, the injection control pulse 804 outputted from the ECU 803 and inputted to the control circuit 801 for driving current is a signal indicating a fuel injection period. A signal for turning on/off the energization of the coil by driving a switch element, such as FET 805, in response to the injection control pulse 804 is generated by the logic circuit 802. Between two injection control pulses 804 (between 408 and 409 in FIG. 4 and between 711 and 712 in FIG. 7), a signal for turning on/off the energization of the coil is generated by the logic circuit 802 to perform the following operation: the movement of the movable core 102 in the direction of valve closing operation is stopped and further it is pulled back to the initial position where it is when valve opening operation is started. The voltage 407 in FIG. 4 or the voltage 709 in FIG. 7 does not involve fuel injection because a fuel injection instruction by the injection control pulse 804 has not been given.

What is claimed is:

1. An electromagnetic fuel injection valve device for an internal combustion engine is configured that, which controls an energization for an electromagnetic coil of a fuel injection valve actuator to control a motion of a movable core for a valve element, comprising a controller is configured to carry out a mid-term energization for the electromagnetic coil, in a time period from after the valve element is brought into contact with a valve seat in a valve closing operation to before a next energization is started, so that a magnetic attractive force of the coil is exerted on the movable core in a direction opposite to a direction of the valve closing operation.

2. An electromagnetic fuel injection valve device for an internal combustion engine, comprising:

a valve element that does valve closing and opening motions for a fuel passage by being pressed on a valve seat and being moved away from the valve seat;

a movable core that does giving and receiving motions with regard to forces for the valve closing and opening motions between the movable core and the valve element;

an electromagnet that has an electromagnetic coil and a stationary core to act as an actuator for the movable core and generates a magnetic attractive force for the valve opening motion, and;

a return spring that exerts a spring force for the valve closing motion on the valve element in the direction opposite to the direction of the magnetic attractive force;

a controller that controls energization for the coil of the electromagnet to generate the magnetic attractive force in the electromagnet, and wherein the controller is configured to carry out an energization to the coil for a valve opening motion and additionally carry out a mid-term energization at a time interval between both an energization for valve opening of a previous fuel injection and an energization for valve opening of a subsequent fuel injection, and wherein a current of the mid-term energization is smaller than a current of the energization for valve opening motion and has the same direction as a direction of the current of the energization for valve opening motion.

3. The electromagnetic fuel injection valve device according to claim 2, wherein the mid-term energization is carried out by an energization of a battery voltage that does not have a dependence on a booster circuit.

4. The electromagnetic fuel injection valve device according to claim 2, wherein the mid-term energization is carried out after the valve element closed the fuel passage.

5. The electromagnetic fuel injection valve device according to claim 2, wherein the mid-term energization is carried out in a predetermined time period.

6. The electromagnetic fuel injection valve device according to claim 2, wherein the mid-term energization is terminated when the current of the mid-term energization reached to the threshold value.

7. The electromagnetic fuel injection valve device according to claim 2, wherein the controller is further configured to receive a injection control pulse instructing the fuel injection from a host controller, and to carry out the mid-term energization in a time period during which no injection control pulse is present and between a previous injection control pulse and a subsequent injection control pulse inputted from the host controller.

8. The electromagnetic fuel injection valve device according to claim 2, wherein the controller is further configured to carry out intermittent energizations during a time period from when the mid-term energization is terminated to when a energization for the next fuel injection is started.

9. The electromagnetic fuel injection valve device according to claim 2, wherein the controller is configured to carry out plural-time energizations to the coil for valve opening motions of plural-time fuel injections in one stroke of the internal combustion engine, and the mid-term energization is carried out at a time interval between both an energization for valve opening of a previous fuel injection and an energization for valve opening of a subsequent fuel injection.

* * * * *